(12) United States Patent
Miller

(10) Patent No.: US 8,998,469 B1
(45) Date of Patent: Apr. 7, 2015

(54) LIGHTED CERAMIC TILE ASSEMBLY

(71) Applicant: Ruth M. Miller, Accokeek, MD (US)

(72) Inventor: Ruth M. Miller, Accokeek, MD (US)

( * ) Notice: Subject to any disclaimer, the term of this patent is extended or adjusted under 35 U.S.C. 154(b) by 199 days.

(21) Appl. No.: 13/736,422

(22) Filed: Jan. 8, 2013

(51) Int. Cl.
*F21V 33/00* (2006.01)
*F21V 8/00* (2006.01)

(52) U.S. Cl.
CPC ............ *F21V 33/006* (2013.01); *G02B 6/0005* (2013.01); *G02B 6/0006* (2013.01)

(58) Field of Classification Search
None
See application file for complete search history.

(56) References Cited

U.S. PATENT DOCUMENTS

| | | | |
|---|---|---|---|
| 4,394,714 A * | 7/1983 | Rote | 362/576 |
| D312,664 S | 12/1990 | Kaut | |
| 5,184,253 A * | 2/1993 | Hwang | 359/889 |
| 5,818,998 A * | 10/1998 | Harris et al. | 385/100 |
| 5,887,102 A * | 3/1999 | Mueller et al. | 385/115 |
| 6,234,657 B1 * | 5/2001 | Shih | 362/559 |
| 6,755,550 B1 | 6/2004 | Lackey | |
| 7,331,686 B2 | 2/2008 | Ossevoort et al. | |
| 7,510,297 B2 | 3/2009 | Dobija et al. | |
| 7,607,793 B2 | 10/2009 | Coushaine et al. | |
| 2005/0057944 A1 * | 3/2005 | Pipo et al. | 362/559 |
| 2005/0060949 A1 * | 3/2005 | McNaught | 52/28 |
| 2005/0116667 A1 * | 6/2005 | Mueller et al. | 315/312 |
| 2006/0280423 A1 * | 12/2006 | Gotfried | 385/147 |
| 2008/0019121 A1 | 1/2008 | Ly | |
| 2008/0025039 A1 * | 1/2008 | Guillermo | 362/556 |
| 2009/0116241 A1 | 5/2009 | Ashoff et al. | |
| 2009/0322202 A1 | 12/2009 | Auday et al. | |

* cited by examiner

*Primary Examiner* — Britt D Hanley

(57) ABSTRACT

A lighted tile assembly illuminates tiles to enhance visibility of a floor or wall surface while enhancing the decorative appearance of the floor surface. The assembly includes a panel having a perimeter edge extending between an upper surface and a lower surface. Each of a plurality of secondary conduits has a first end extending into a primary conduit and a second end extending through the upper surface. A fiber optic trunk line is coupled to the panel and positioned in the primary conduit. Each of a plurality of fiber optic filaments is positioned in and extends through an associated one of the secondary conduits. Each filament has a second end positioned proximate the second end of the associated secondary conduit and a first end operationally coupled to the trunk line. Thus, the second end of the filament provides visible light through the second end of the associated secondary conduit.

5 Claims, 4 Drawing Sheets

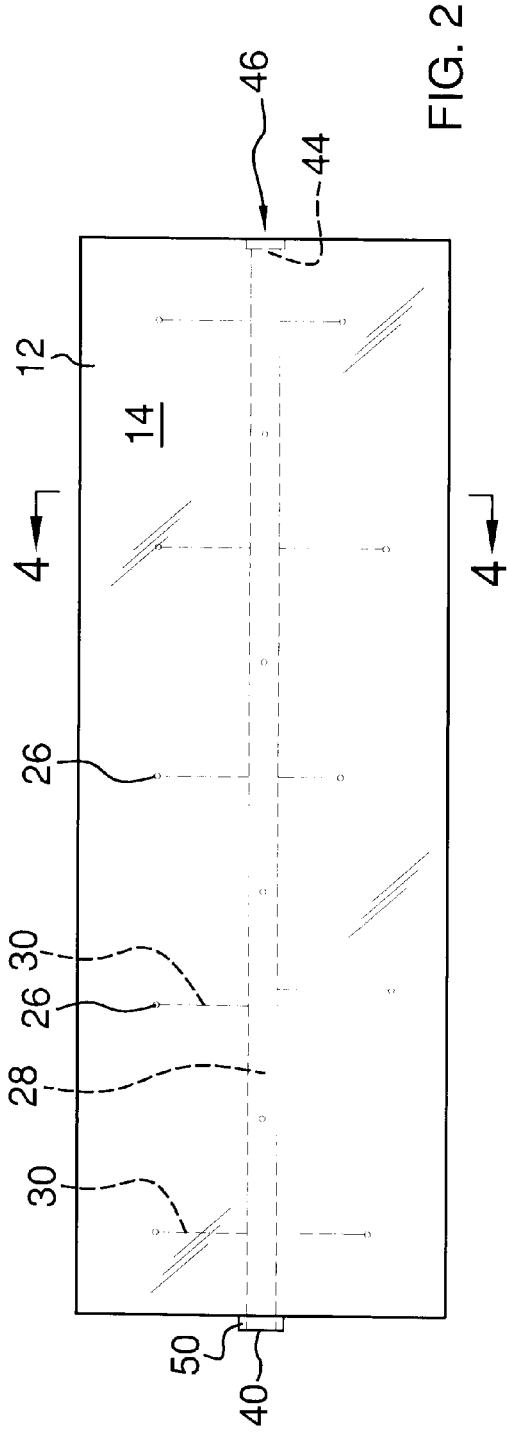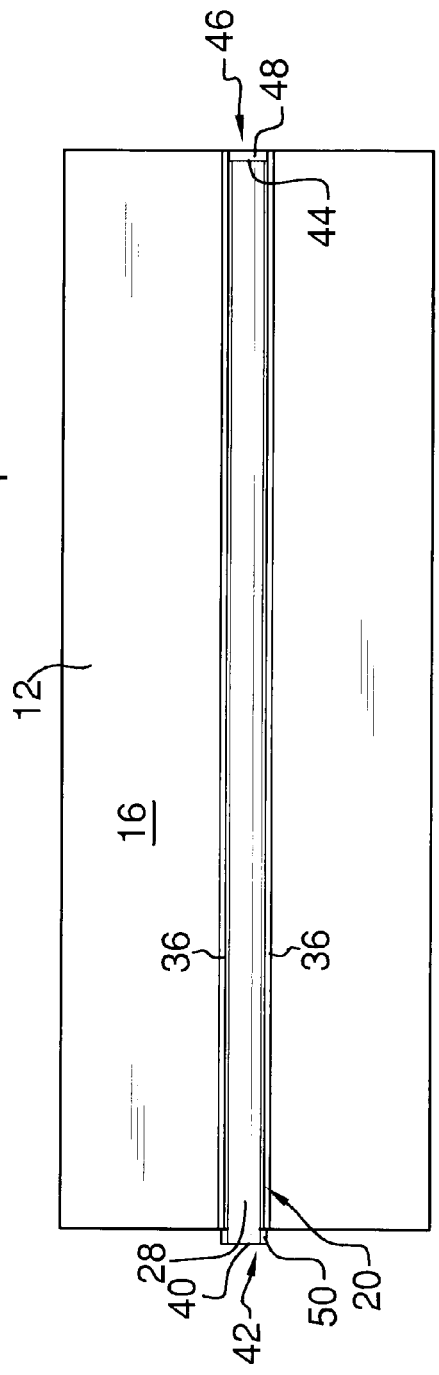

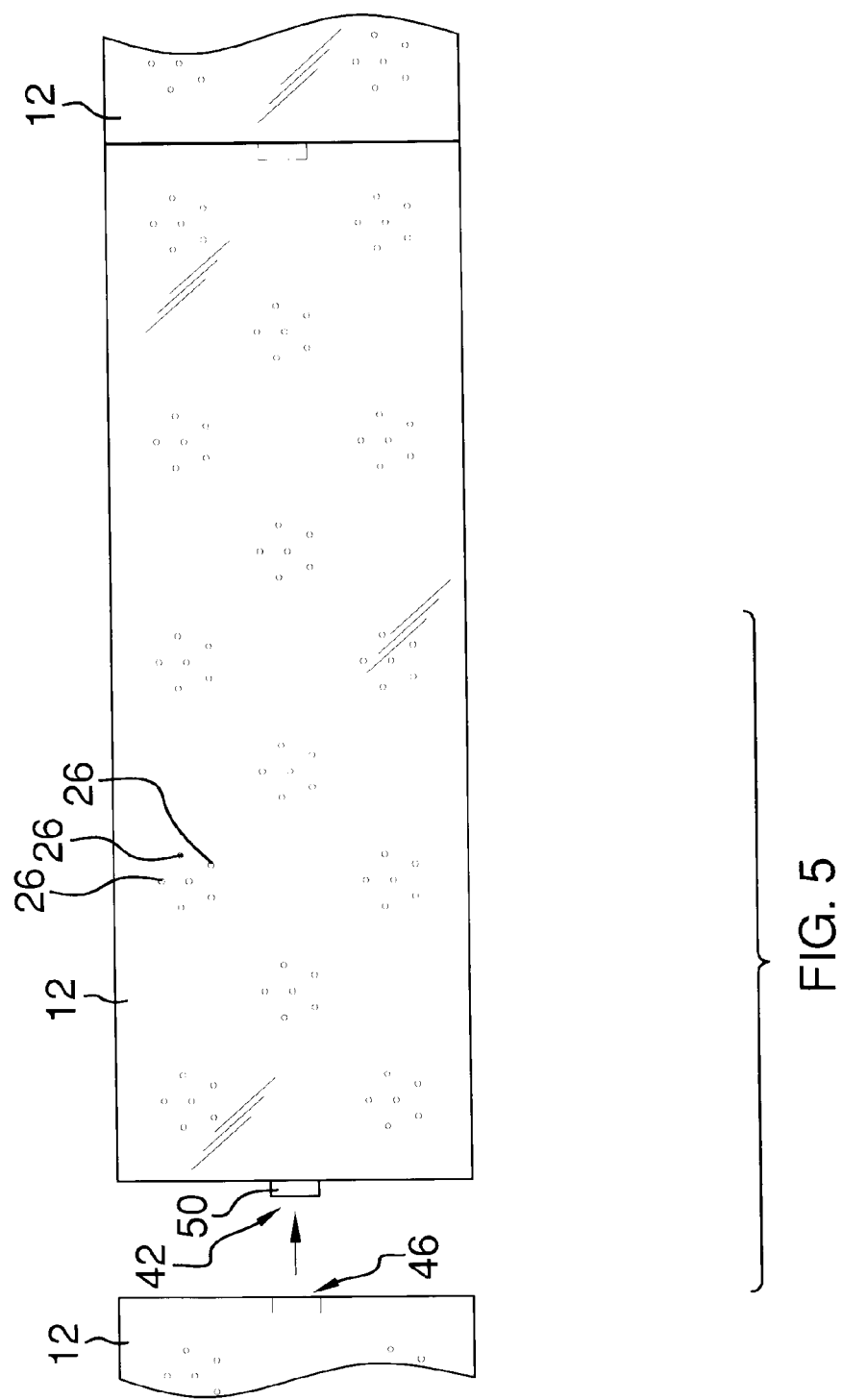

LIGHTED CERAMIC TILE ASSEMBLY

BACKGROUND OF THE DISCLOSURE

Field of the Disclosure

The disclosure relates to tile devices and more particularly pertains to a new tile device for selectively illuminating tiles to enhance visibility of a floor or wall surface while enhancing the decorative appearance of the floor or wall surface.

SUMMARY OF THE DISCLOSURE

An embodiment of the disclosure meets the needs presented above by generally comprising a panel having an upper surface, a lower surface, and a perimeter edge extending around the panel between the upper surface and the lower surface. A primary conduit is coupled to the panel. Each of a plurality of secondary conduits has a first end extending into the primary conduit and a second end extending through the upper surface. A fiber optic trunk line is coupled to the panel and positioned in the primary conduit. Each of a plurality of fiber optic filaments is positioned in and extends through an associated one of the secondary conduits. Each filament has a second end positioned proximate the second end of the associated secondary conduit and a first end operationally coupled to the trunk line. Thus, the second end of the filament provides visible light through the second end of the associated secondary conduit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a top view of an embodiment of the disclosure.

FIG. 3 is a bottom view of an embodiment of the disclosure.

FIG. 5 is a top view of an embodiment of the disclosure.

DESCRIPTION OF THE PREFERRED EMBODIMENT

Figure 1:
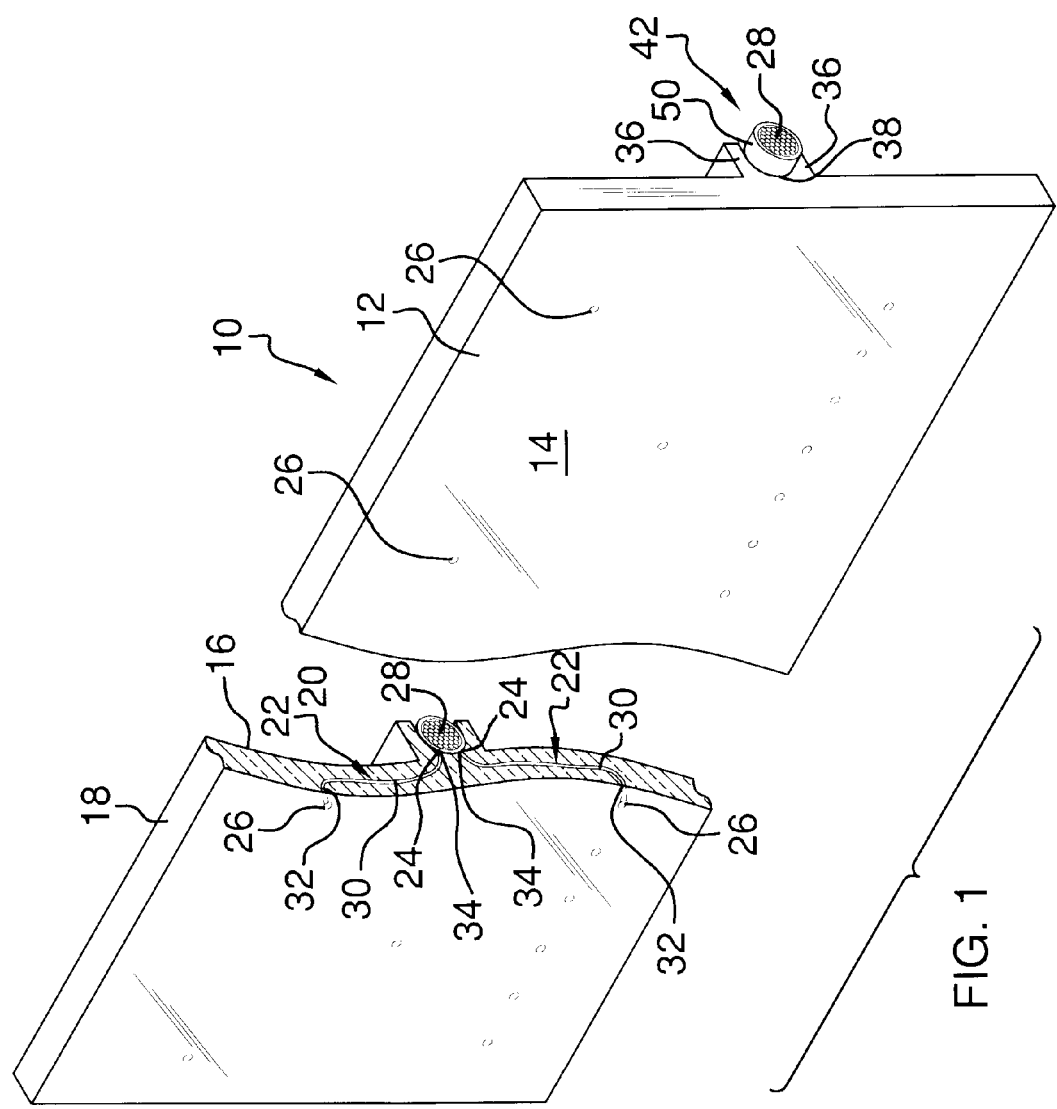
FIG. 1 is a partial cutaway top front side perspective view of a lighted ceramic tile assembly according to an embodiment of the disclosure.
Figure 6:
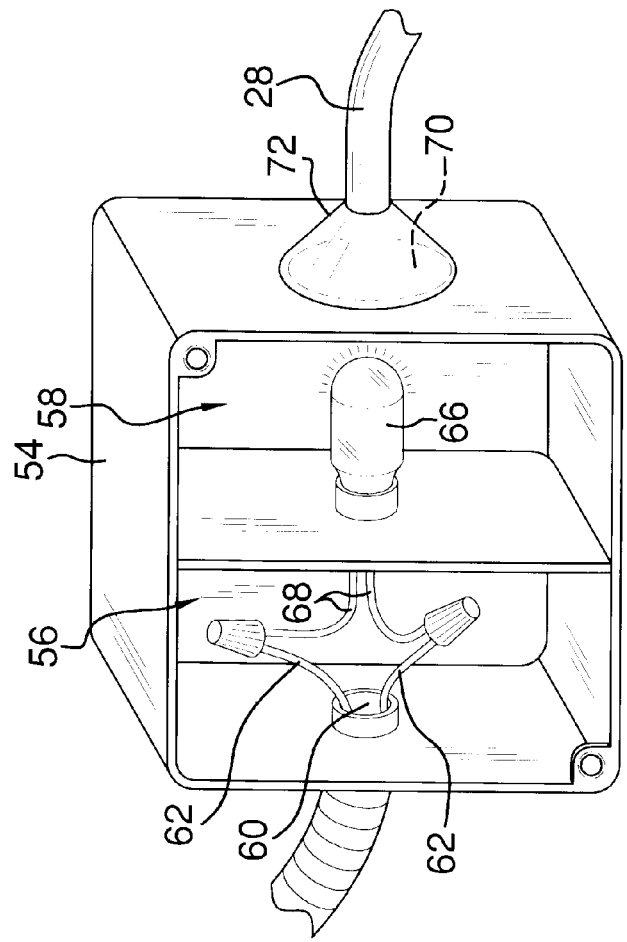
FIG. 6 is a top front side perspective view of an embodiment of the disclosure.
Figure 4:
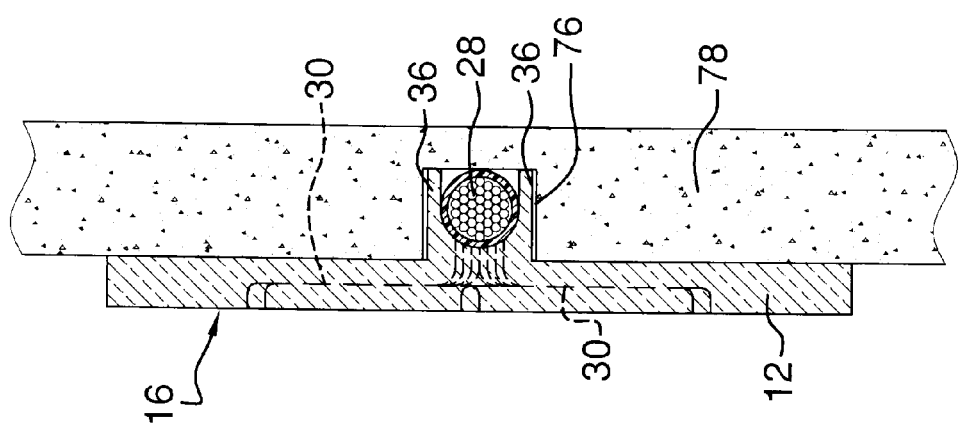
FIG. 4 is a cross-sectional view of an embodiment of the disclosure taken along line 4-4 of FIG. 2.

With reference now to the drawings, and in particular to FIGS. 1 through 6 thereof, a new tile device embodying the principles and concepts of an embodiment of the disclosure and generally designated by the reference numeral 10 will be described.

As best illustrated in FIGS. 1 through 6, the lighted ceramic tile assembly 10 generally comprises a plurality of interconnecting panels 12. Each panel 12 has an upper surface 14, a lower surface 16, and a perimeter edge 18 extending around the panel 12 between the upper surface 14 and the lower surface 16. Each panel 12 has a primary conduit 20 coupled to the panel 12. Each panel 12 has a plurality of secondary conduits 22. The secondary conduits 22 extend through the panel 12. Each secondary conduit 22 has a first end 24 extending into the primary conduit 20 of the panel 12. Each secondary conduit 22 has a second end 26 extending through the upper surface 14 of the panel 12. A plurality of fiber optic trunk lines 28 is provided. Each trunk line 28 is coupled to an associated one of the panels 12 and positioned in the primary conduit 20 of the associated panel 12. A plurality of fiber optic filaments 30 is provided. Each filament 30 is positioned in and extends through an associated one of the secondary conduits 22. Each filament 30 has a second end 32 positioned proximate the second end 26 of the associated secondary conduit 22. Each filament 30 further has a first end 34 operationally coupled to the trunk line 28 of the associated panel 12. Thus, the second end 32 of the filament 30 provides visible light through the second end 26 of the associated secondary conduit 22.

Each panel 12 having a pair of elongated projections 36 coupled to and extending from the lower surface 16 of the panel 12. The projections 36 define the primary conduit 20 of the panel 12. An arcuate upper surface 38 extends between the projections 36 of each panel 12. The trunk line 28 of the associated panel 12 abuts the arcuate upper surface 38 of the panel 12.

Each trunk line 28 has a first end 40 extending outwardly from the perimeter edge 18 of the associated panel 12 defining a male connector 42 for the associated panel 12. Each trunk line 28 further has a second end 44 inset from the perimeter edge 18 of the associated panel 12 defining a female connector 46 of the associated panel 12. The male connector 42 of each panel 12 is couplable to the female connector 46 of an adjacently positioned one of the panels 12. Thus, the panels 12 can be coupled together in series. A cavity 48 extends into the perimeter edge 18 of the panel 12 adjacent to the second end 44 of the trunk line 28. The cavity 48 extends radially outward from the primary conduit 20 and may be annular further defining an outer portion of the female connector 46. A collar 50 may be coupled to the trunk line 28. The collar 50 extends radially outward from the trunk line 28 adjacent to the first end 40 of the trunk line 28 such that the collar 50 is incorporated into the male connector 42. When coupled together, adjacent panels 12 the male connector 42 and female connector 46 may be configured to provide a desired spacing between the adjacent panels 12. The spacing may be between 1 and 7 millimeters to accommodate grouting between the panels 12. The spacing may be standardized when the male connector 42 is fully inserted into the female connector 46 to provide a consistent spacing between the panels 12.

An electrical box 54 has a first chamber 56 and a second chamber 58. A first aperture 60 extends into the first chamber 56 wherein the electrical box 54 is configured for coupling to electrical wiring 62 extending into the first chamber 56. A light emitter 66 is coupled to the electrical box 54. The light emitter 66 is positioned in the second chamber 58 and has electrical connections 68 extending into the first chamber 56. Thus, the light emitter 66 is configured for being electrically coupled to the wiring 62 extending into the first chamber 54.

A second aperture 70 extends through the electrical box 54 into the second chamber 58. A trunk connector 72 is coupled to the electrical box 54. The trunk connector 72 is adjacent the second aperture 70 and may be a cone shape to facilitate collection of light from said light emitter into said trunk lines 28. Each trunk line 28 is operationally coupled to the trunk connector 72 wherein the light emitter 66 provides light to each trunk line 28 when the light emitter 66 is illuminated.

In use, a channel 76 is extended into a base member 78 such as drywall. The panels 12 are interconnected by inserting the male connectors 42 into associated female connectors 46 and installing the panels 12 on the base member 78. The trunk lines 28 are provided with light from the light emitter 66. The second ends 26 of the secondary conduits 22 are arranged into a desired pattern to provide decorations to the panels 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A lighted tile assembly comprising:
a panel having an upper surface, a lower surface, and a perimeter edge extending around said panel between said upper surface and said lower surface;
a primary conduit coupled to said panel;
a plurality of secondary conduits, each secondary conduit having a first end extending into said primary conduit, each secondary conduit having a second end extending through said upper surface;
a fiber optic trunk line coupled to said panel and positioned in said primary conduit; and
a plurality of fiber optic filaments, each filament being positioned in and extending through an associated one of said secondary conduits, each filament having a second end positioned proximate said second end of said associated secondary conduit, each said filament having a first end operationally coupled to said trunk line wherein said second end of said filament provides visible light through said second end of said associated secondary conduit;
a pair of elongated projections coupled to and extending from said lower surface of said panel, said projections defining said primary conduit;
an arcuate upper surface extending between said projections, said trunk line abutting said arcuate upper surface; and
said trunk line having a first end extending outwardly from said perimeter edge of said panel defining a male connector, said trunk line having a second end inset from said perimeter edge of said panel defining a female connector.

2. The assembly of claim 1, further comprising a plurality of said panels, said male connector of each said panel being couplable to said female connector of an adjacently positioned one of said panels.

3. The assembly of claim 1, further comprising:
a cavity extending into said perimeter edge of said panel adjacent to said second end of said trunk line, said cavity extending radially outward from said primary conduit; and
a collar coupled to said trunk line, said collar extending radially outward from said trunk line adjacent to said first end of said trunk line.

4. A lighted tile assembly comprising:
a panel having an upper surface, a lower surface, and a perimeter edge extending around said panel between said upper surface and said lower surface;
a primary conduit coupled to said panel;
a plurality of secondary conduits, each secondary conduit having a first end extending into said primary conduit, each secondary conduit having a second end extending through said upper surface;
a fiber optic trunk line coupled to said panel and positioned in said primary conduit; and
a plurality of fiber optic filaments, each filament being positioned in and extending through an associated one of said secondary conduits, each filament having a second end positioned proximate said second end of said associated secondary conduit, each said filament having a first end operationally coupled to said trunk line wherein said second end of said filament provides visible light through said second end of said associated secondary conduit;
an electrical box having a first chamber and a second chamber;
a first aperture extending into said first chamber wherein said electrical box is configured for coupling to electrical wiring extending into said first chamber;
a light emitter coupled to said electrical box, said light emitter being positioned in said second chamber, said light emitter having electrical connections extending into said first chamber wherein said light emitter is configured for being electrically coupled to the wiring extending into said first chamber;
a second aperture extending through said electrical box into said second chamber; and
a trunk connector coupled to said electrical box, said trunk connector being adjacent said second aperture, said trunk line being coupled to said trunk connector wherein said light emitter provides light to said trunk line when said light emitter is illuminated.

5. A lighted tile assembly comprising:
a plurality of panels, each said panel having an upper surface, a lower surface, and a perimeter edge extending around said panel between said upper surface and said lower surface;
each said panel having a primary conduit coupled to said panel;
each said panel having a plurality of secondary conduits, said secondary conduits extending through said panel, each secondary conduit having a first end extending into said primary conduit of said panel, each secondary conduit having a second end extending through said upper surface of said panel;
a plurality of fiber optic trunk lines, each trunk line being coupled to an associated one of said panels and positioned in said primary conduit of said associated panel;
a plurality of fiber optic filaments, each filament being positioned in and extending through an associated one of said secondary conduits, each filament having a second end positioned proximate said second end of said associated secondary conduit, each said filament having a first end operationally coupled to said trunk line of said associated panel wherein said second end of said filament provides visible light through said second end of said associated secondary conduit;

each said panel having a pair of elongated projections coupled to and extending from said lower surface of said panel, said projections defining said primary conduit of said panel, an arcuate upper surface extending between said projections of each said panel, said trunk line of said associated panel abutting said arcuate upper surface of said panel;

each said trunk line having a first end extending outwardly from said perimeter edge of said associated panel defining a male connector for said associated panel, each said trunk line having a second end inset from said perimeter edge of said associated panel defining a female connector of said associated panel, said male connector of each said panel being couplable to said female connector of an adjacently positioned one of said panels;

a cavity extending into said perimeter edge of said panel adjacent to said second end of said trunk line, said cavity extending radially outward from said primary conduit;

a collar coupled to said trunk line, said collar extending radially outward from said trunk line adjacent to said first end of said trunk line;

an electrical box having a first chamber and a second chamber;

a first aperture extending into said first chamber wherein said electrical box is configured for coupling to electrical wiring extending into said first chamber;

a light emitter coupled to said electrical box, said light emitter being positioned in said second chamber, said light emitter having electrical connections extending into said first chamber wherein said light emitter is configured for being electrically coupled to the wiring extending into said first chamber;

a second aperture extending through said electrical box into said second chamber; and a trunk connector coupled to said electrical box, said trunk connector being adjacent said second aperture, each said trunk line being operationally coupled to said trunk connector wherein said light emitter provides light to each said trunk line when said light emitter is illuminated.

* * * * *